United States Patent [19]

Cronin

[11] Patent Number: 4,575,027
[45] Date of Patent: Mar. 11, 1986

[54] ELECTROMECHANICAL ACTUATOR SYSTEM WITH ANTI-JAMMING FEATURES

[75] Inventor: Michael J. Cronin, Sherman Oaks, Calif.

[73] Assignee: Lockheed Corporation, Burbank, Calif.

[21] Appl. No.: 495,013

[22] Filed: May 16, 1983

[51] Int. Cl.⁴ .......................................... B64C 13/42
[52] U.S. Cl. ...................... 244/75 R; 244/213; 244/76 R; 244/224; 244/228; 74/480 R; 91/509
[58] Field of Search ............ 244/213, 214, 215, 75 R, 244/76 R, 175, 194, 227, 228, 229, 224; 310/112, 114; 74/661, 479, 480; 91/509, 510

[56] References Cited

U.S. PATENT DOCUMENTS

| | | | |
|---|---|---|---|
| 2,315,110 | 3/1943 | Dornier | 244/83 |
| 2,441,247 | 5/1948 | Mooney | 74/407 |
| 2,491,842 | 12/1949 | Wells | 318/8 |
| 2,549,815 | 4/1951 | Huntington | 74/625 |
| 2,590,716 | 3/1952 | Lisle | 91/510 |
| 2,652,995 | 9/1953 | Swain et al. | 244/194 |
| 2,909,764 | 10/1959 | Chambers | 244/194 |
| 2,949,258 | 8/1960 | Bell | 244/194 |
| 3,140,843 | 7/1964 | Pettit | 244/197 |
| 3,790,108 | 2/1974 | Bock | 244/83 |
| 3,950,686 | 4/1976 | Randall | 318/564 |
| 3,958,779 | 5/1976 | Townsend | 244/75 R |
| 3,986,412 | 10/1976 | Farley | 74/661 |
| 4,289,996 | 9/1981 | Barnes et al. | 318/38 |

FOREIGN PATENT DOCUMENTS

| | | | |
|---|---|---|---|
| 576797 | 4/1946 | United Kingdom | 244/228 |
| 2031356 | 4/1980 | United Kingdom | 244/213 |

Primary Examiner—Trygve M. Blix
Assistant Examiner—Rodney Corl
Attorney, Agent, or Firm—Louis L. Dachs

[57] ABSTRACT

An actuator system for controlling the position of an aerodynamic control surface of an aircraft is disclosed. The actuator system (10) comprises a rotary actuator (12) rotatably mounted to the aircraft structure (20) with the actuator having an output member (22) adapted to be coupled to the control surface. A latch assembly (37) is provided which is mounted to the structure which releasably engages the actuator. Preferably, the latch assembly (37) comprises a grooved flange (38) mounted on the actuator (12) and a solenoid (47) mounted to the aircraft structure which is adapted to move a locking pin (44) from a first position in engagement with the grooved flange (38) to a second position out of engagement with the groove. In a second embodiment, a second rotary actuator (114) is mounted to the aircraft structure and is adapted to rotate the actuator (81) upon its failure and after the latch assembly is activated. In a third embodiment a second rotary actuator (164) is coupled to the input shaft (160) of the actuator (150) and after the latch assembly is activated rotation of the actuator (150) is accomplished by the second rotary actuator (164) via the input shaft. In addition, should the actuator assembly fail electrically, and not be jammed, the second actuator (164) drives the input shaft which in turn drives the output member and thus the latch assembly need not be activated.

8 Claims, 7 Drawing Figures

ELECTROMECHANICAL ACTUATOR SYSTEM WITH ANTI-JAMMING FEATURES

TECHNICAL FIELD

The invention relates to the field of actuator systems for control surfaces of an aircraft and more particularly to an actuator system that can be bypassed upon failure.

BACKGROUND ART

With the prospective emergence of the All Electric Airplane, in which all functions and services are performed electrically, the flight-control surfaces will be activated by some type of electromechanical actuator system (EMAS). Typically, such an EMAS will interface with a quad-redundant fly-by-wire/fly-by-light (FBW/FBL) system that will furnish command information to the EMA, with flight control system computers being in turn responsible for the control and management of the EMAS and the airplane's flight characteristics.

In the past, and in most current large airplanes, the control surface actuator function is performed with hydraulic jacks or cylinders. In the event of a hydraulic supply failure (or a failure in the closed loop servo control or a stuck servo-valve etc.) in such systems the hydraulic ram can be bypassed to permit other actuators, connected to the same surface, to continue operation. In the case of the EMAS, however, there is concern that a broken-tooth in a gear-train, or a bearing seizure will inhibit the operation of other (redundant) actuators, for there is no simple method to bypass or free-wheel, the jammed actuators.

Prior examples of attempts to solve this problem include U.S. Pat. No. 2,441,247 "Mechanical Translating Device" by A. W. Mooney which discloses an electrically powered actuator rotatably mounted to the aircraft structure. Rotation of the actuator is prevented by a circular gear mounted to the actuator which is in engagement with a worm gear. Thus, in normal operation, rotation of an output shaft can be accomplished because the worm gear prevents the actuator from rotating. Should the actuator fail, the worm gear can be rotated by mechanical means or any other drive means, thus still providing an effective output.

The problem with this actuation system is that if redundancy is required, i.e., two separate actuators controlling the same control surface, there is no means to automatically disengage a failed actuator, since the worm gear cannot be back driven, effectively preventing the actuator from rotating.

Another patent of interest is U.S. Pat. No. 3,950,686 "Series Reedundant Drive System" by James C. Randall. Here a plurality of motors are mechanically connected in series so as to provide operational redundancy. The shaft of a given motor is rigidly attached to the housing of the next motor in the series so that rotation of the first shaft will cause the motor and its shaft to rotate. While this system will provide effective operation should one motor fail, the output shafts are held in position by means of the magnetic attraction between the rotor and poles. This does not provide for a positive lock on the position of the control surface connected thereto.

Still another patent of interest is U.S. Pat. No. 4,289,996 "Actuators" by R. R. Barnes et al. Here a pair of motors are coupled to a differential gear assembly which in turn drives a screw assembly attached to the load (a control surface). A lock mechanism is provided on each motor which will lock the motor and prevent its output shaft from rotating should failure of the motor occur. This allows the other motor to continue to drive the control surface through the differential gear assembly. This system requires that each motor be coupled together by a differential gear assembly. Should the differential gear assembly fail, both motors become ineffective.

Other patents of interest are U.S. Pat. No. 3,790,108 "Redundant Stabilizer Control" by J. W. Bock; U.S. Pat. No. 2,315,110 "Control Apparatus for Aircraft" by C. Dornier; U.S. Pat. No. 2,491,842 "Actuator System" by B. A. Wells; U.S. Pat. No. 2,549,815 "Servo Unit" by W. L. Huntington; U.S. Pat. No. 3,140,843 "Servo System" by R. H. Pettet; and U.K. Pat. No. 576,797 "Improvements in Electric Motor Drive Units" by C. Heal.

Therefore, it is a primary object of the subject invention to provide an actuation system for controlling the position of a control surface of an aircraft wherein a jammed or disabled actuator can be effectively bypassed and, thus, allowing other actuators to freely function.

It is another object of this invention to provide an actuation system having a simplified unlocking means for a jammed or disabled actuator by allowing the actuator to freely rotate about its axis of rotation while remaining connected to the control surface.

Another object of the subject invention is to provide an actuation system wherein a primary actuator is coupled with a secondary or emergency actuator and a simplified means is provided to free a jammed primary actuator so that the secondary actuator can actuate the control surface by rotating the primary actuator.

DISCLOSURE OF INVENTION

An actuator system for controlling the position of an aerodynamic control surface of an aircraft, such as an aileron, is disclosed. The actuator system comprises a rotary actuator rotatably mounted to the aircraft structure with the actuator having an output member coupled to the control surface. A latch assembly is provided which is mounted to the structure and which releasably engages the actuator. Preferably, the latch assembly comprises a grooved flange mounted on the actuator and a solenoid mounted to the aircraft structure which is adapted to move a locking pin from a first position in engagement with the grooved flange preventing the actuator from rotating to a second position out of engagement with the groove. While the use of a grooved flange is preferred, a hole in the flange would suffice, or even a hole in the actuator body itself. In a second embodiment, a second rotary actuator is mounted to the aircraft structure. The second rotary actuator incorporates an output shaft coupled to and adapted to rotate the first actuator upon its failure and upon the latch assembly actuated to its second position causing the withdrawal of the pin from the grooved flange. In yet a third embodiment a second rotary actuator is coupled to the input shaft of the first actuator and adapted to rotate it therein.

The novel features which are believed to be characteristics of the invention, both as to its organization and its method of operation, together with further objects and advantages thereof, will be better understood from the following description in connection with the accompanying drawings in which presently preferred embodiments of the invention are illustrated by way of example. It is to be expressly understood, however, that the drawings are for purposes of illustration and description only, and are not intended as as definition of the limits of the invention.

BRIEF DESCRIPTION OF THE DRAWINGS

Illustrated in FIG. 1 is a perspective view of the actuator assembly shown in the latched position;

Illustrated in FIG. 2 is a side elevation view of the actuator assembly shown in FIG. 1 partially broken away;

Figure 3:
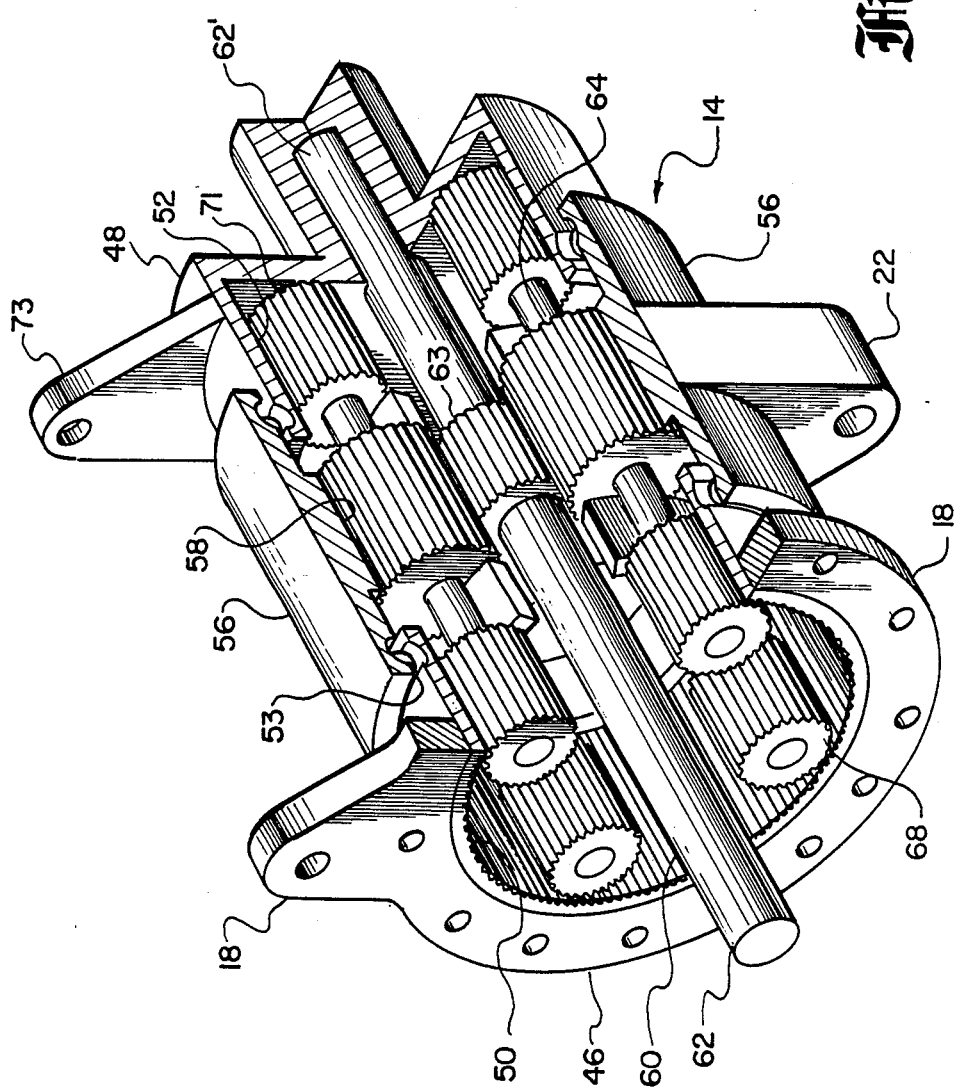
Figure 4:
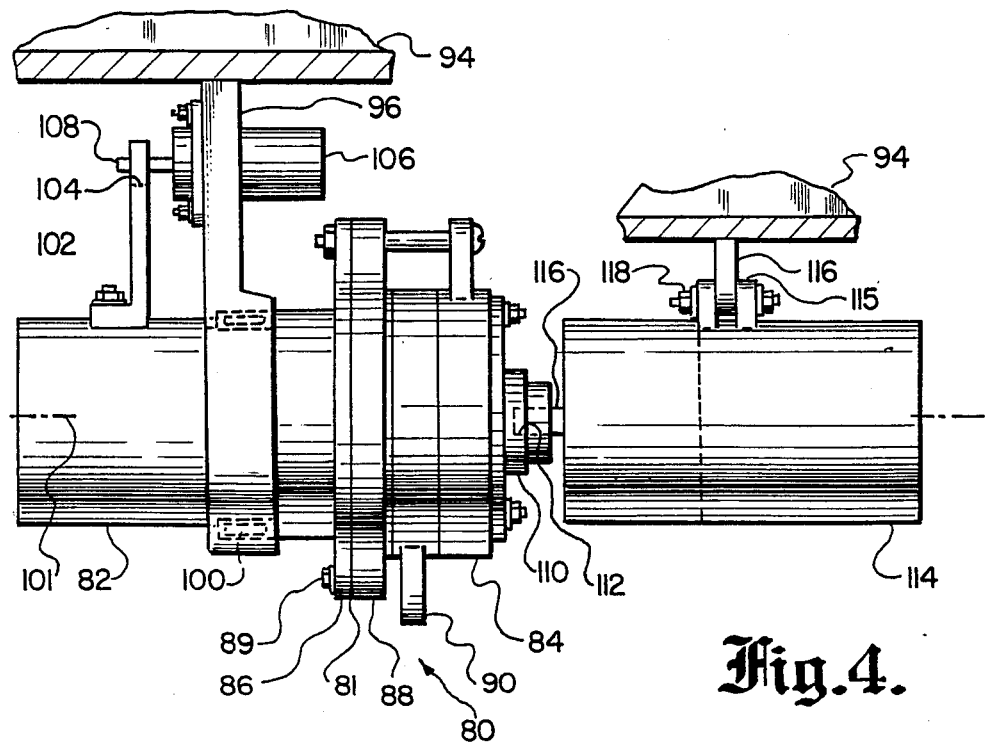
Figure 5:
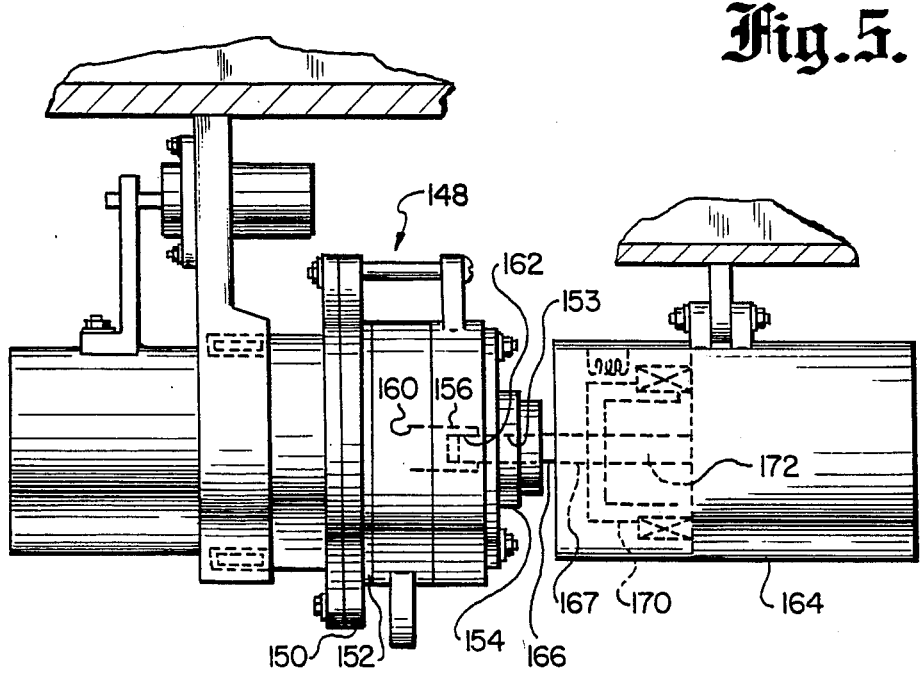
Figure 6:
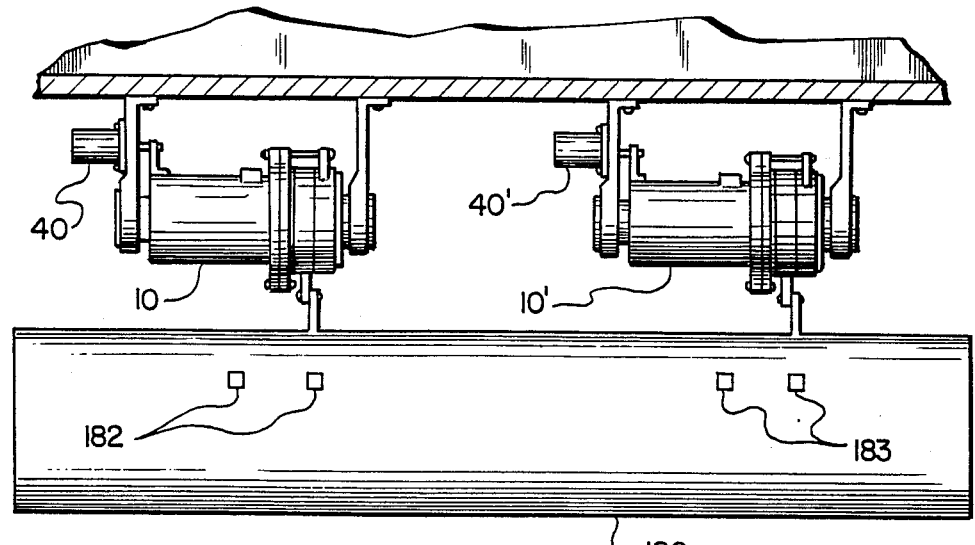
Figure 7:
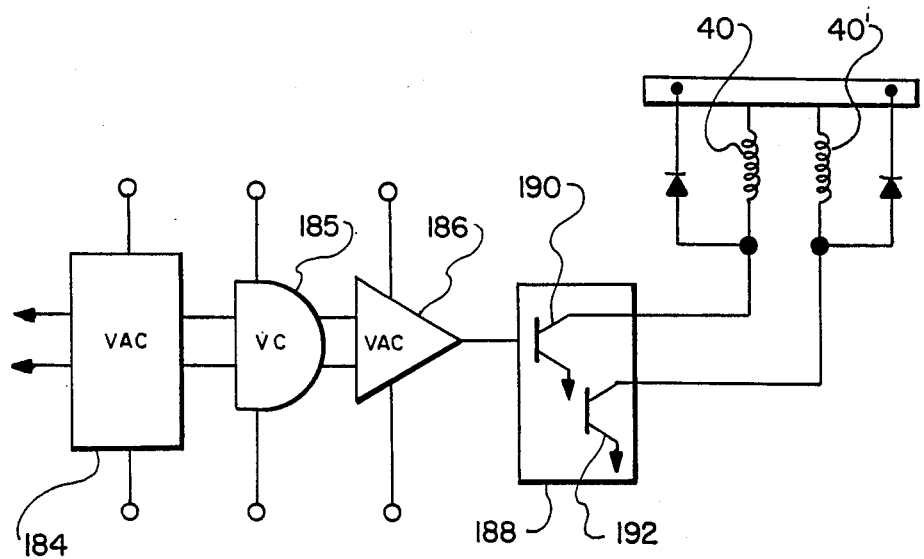

Illustrated in FIG. 3 is a perspective view of a gear reduction unit suitable for use in the actuator assembly partially broken away to show the interior thereof;

Illustrated in FIG. 4 is a side elevation view of a second embodiment of the actuator assembly wherein a secondary actuator is coupled to the actuator assembly housing and which is adapted to drive the actuator;

Illustrated in FIG. 5 is a third embodiment of the actuator assembly wherein a secondary actuator is coupled to the input shaft of the gear reduction unit for driving the actuator;

Illustrated in FIG. 6 is a downward locking view of an aerodynamic control surface controlled by redundant actuator assemblies; and Illustrated in FIG. 7 is a schematic of a control circuit for detecting a faulty actuator and providing a signal that can be used for bypassing the faulty actuator.

BEST MODE FOR CARRYING OUT THE INVENTION

Figure 1:
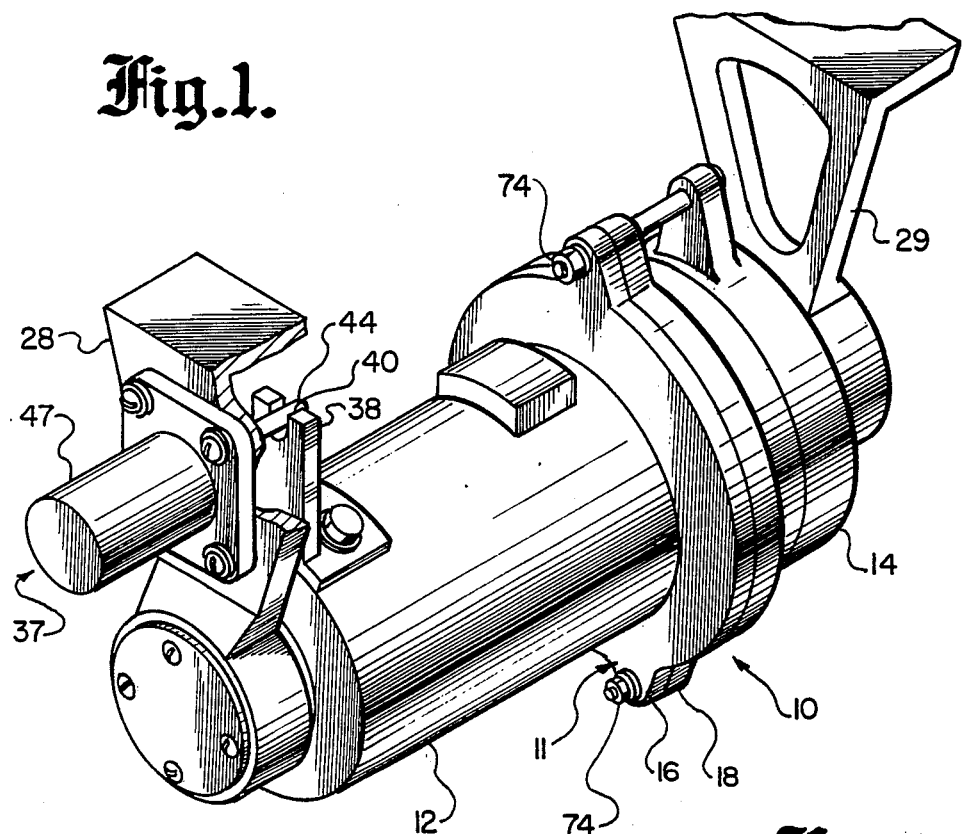
Figure 2:
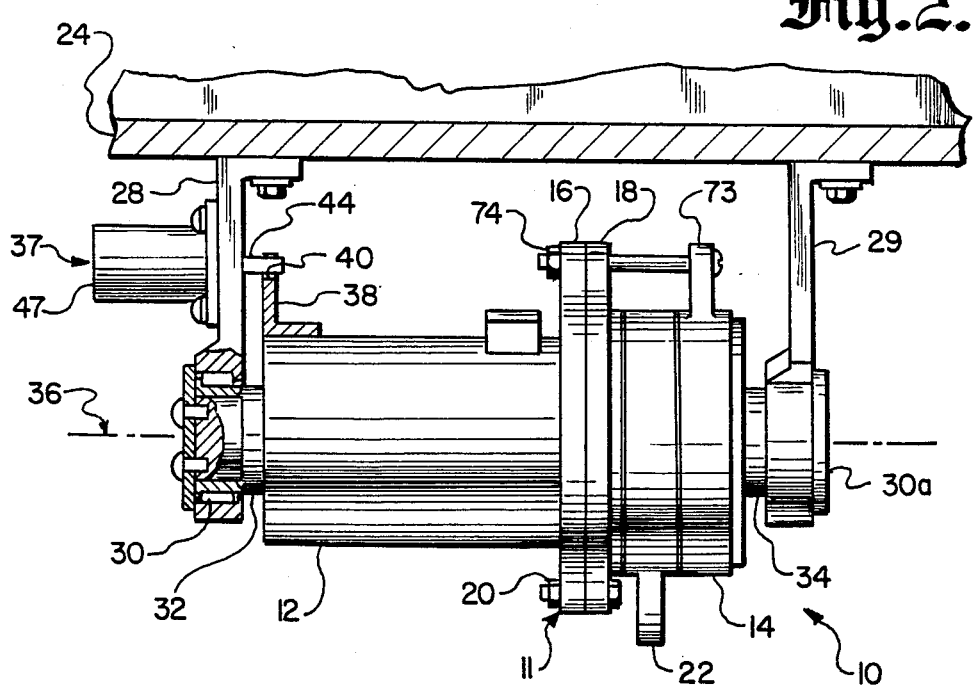

Illustrated in FIG. 1 is a perspective view of the actuator assembly, while illustrated in FIG. 2 is a side elevation view of the actuator assembly shown in FIG. 1 partially broken away. Referring to FIGS. 1 and 2, it can be seen that the actuator assembly, generally designated by numeral 10, comprises an actuator 11 consisting of a motor portion 12, typically an electric motor, coupled to a gear reduction unit 14. The motor 12 incorporates a flange 16 which is adapted to mate with a flange 18 mounted on the gear reduction unit 14 by fastener assemblies 20. The gear reduction unit 14 incorporates lug 22. The lug 22 is typically connected to an aerodynamic surface. Note, the gear reduction unit 14 will be discussed in greater detail further on in the specification.

The actuator 11 is rotatably mounted in the aircraft structure 24 via mounting flanges 28 and 29. In the embodiment shown in FIGS. 1 and 2, this is accomplished by means of trunnion bearing assembly 30 located at end 32 of actuator 11 and trunnion bearing assembly 30a (the details of which are not shown) located at end 34 of the actuator 11. Thus, without restraint, the actuator 11 is free to rotate about its axis of rotation 36.

A latch means 37 is provided to react the torque produced by the actuator 11 when in operation. The latch means preferably comprises a flange 38 mounted to the motor 12 having a groove 40 therein. Attached to the flange 28 is an electrically operated solenoid 47 coupled to and adapted to move a pin 44 from within the groove 40 (first position) to a second position out of engagement with the groove 40. When pin 44 is removed from the groove 40, rotation of the actuator 11 is possible. It should be noted that while a groove is illustrated, a hole in the flange 38 would suffice. Alternately, a hole directly in the actuator 11 could be used.

Illustrated in FIG. 3 is a perspective view of the gear reduction unit 14 partially broken away to show the interior thereof. A typical gear reduction 14 suitable for use in the subject actuator assembly 10 comprises stationary outer housings 46 and 48 having internal gear teeth 50 and 52, respectively. Rotatably mounted to the housings 46 and 48 via bearings 53 is output member 56 having lug 22 mounted thereto. The output member 56 also has internal gear teeth designated by numeral 58. The gear reduction unit 14 has a centrally located input shaft 60 having ends 62 and 62' with a central gear 63 mounted thereto. The gear 63 engages a first set of spindle gears 64 which in turn engage internal gear teeth 58 on the output member 56 and furthermore are likewise coupled to spindle gear assemblies 68 and 71. Spindle gear assemblies 68 and 71 engage internal gear teeth 50 and 52, respectively.

Because outer stationary housings 46 and 48 can rotate relative to each other, a mechanical torque restraint is required. This is accomplished by the mounting of flange 18 to housing 46 and a lug 73 to housing 48 and tieing them together and to flange 16 of the motor 12 by fastener assembly 74 (best illustrated in FIGS. 1 and 2).

In this type of gear reduction, a very large speed reduction is possible by proper selection of the number of teeth in each particular gear or gear assembly. While a gear reduction unit is illustrated, it should be understood that the input shaft 60 could be directly coupled to the output member 56 but in most practical applications a speed reduction/torque amplification is required because of the large hinge-moments reflected by the control surfaces of modern high speed aircraft.

Referring now to FIGS. 1, 2 and 3, it can be seen that should any part of the actuator 11 fail the solenoid 40 can be activated, retracting the pin 44 from the groove 40 of the flange 38, thus allowing the actuator 11 to freely rotate about its axis of rotation 36. In most practical applications of this embodiment, two or more such actuator assemblies 10 are used in parallel (see FIG. 6). Thus, should one jam, the other(s) can still be used to drive the control surface, while the actuator of the jammed unit rotates freely.

Illustrated in FIG. 4 is a side elevation view of a second embodiment. It can be seen that the actuator assembly, generally designated by numerals 80, comprises an actuator 81 comprising a motor portion 82, typically an electric motor, coupled to a gear reduction unit 84 (similar to gear reduction unit 14). The motor 82 incorporates a flange 86 which is adapted to interface mechanically with a flange 88 mounted to a gear reduction unit 84 by means of fastener assemblies 89 (only one is shown). The gear reduction unit 84 incorporates an output lug 90. The actuator 81 is mounted to the aircraft structure 94 via mounting flange 96 and is rotatably mounted therein by means of bearing assembly 100 (typically a sleeve or needle bearing). Thus, without restraint, the actuator 81 is free to rotate about the axis of rotation 101. A flange 102 having a groove 104 therein is mounted to the motor 82. Attached to the flange 96 is an electrically operated solenoid 106 coupled to and adapted to move a pin 108 from the groove 104 (first position) to a second position out of engagement with the groove 104, thus allowing the actuator 81 to freely rotate about its axis of rotation 101.

The actuator 81 at end 110 incorporates an opening 112 having internal splines. Also mounted to the aircraft's structure 94 is a second electric motor 114. Mounting of the motor 114 is, typically, provided by attaching a clevis 115 to the motor which is adapted to mate with lug 116 mounted to structure 94 and held together by fastener assembly 118. The motor 114 has an externally splined drive shaft 116 adapted to mate with an internally splined opening 112 on the actuator 81. Thus, in this embodiment, should the actuator 81 fail, solenoid 106 can be energized, withdrawing the pin 108 from the groove 104 of the flange 102. With the pin 108 withdrawn, it is now possible for the motor 114 to rotate actuator 81 and so drive the control surface.

Illustrated in FIG. 5 is a side elevation view of a third embodiment, generally similar to the one disclosed in FIG. 4. It can be seen that assembly 148, for all intents and purposes, as identical to actuator assembly 80 illustrated in FIG. 4, except that the gear reduction unit 152 (similar to gear reduction unit 84) is modified to incorporate an aperture 153 at end 154 and the end 156 of centrally located input shaft 160 (similar to end 62' of input shaft 60 illustrated in FIG. 3) is modified to incorporate internal splines 162. The secondary motor 164 (similar to the motor 114 illustrated in FIG. 4) is modified in the following fashion: (1) the output shaft 166 incorporates external splines adapted to mate with the internal splines 162 of shaft 160, (2) the opposite end 167 of the output shaft 166 is coupled to an electromagnetic clutch 170. The internal drive shaft 172 is also coupled to the clutch 170.

Thus, in normal operation, the drive shaft 172 is disconnected from the output shaft 166 by means of clutch 170. However, should the actuator 150 fail, it can be made free to rotate in the manner previously discussed. The clutch 170 is energized, coupling the drive shaft 172 to the output shaft 166, driving the actuator 150. If, however, the actuator 150 has not jammed but has only suffered a loss of power, then the actuator 150 may remain latched and the gear reduction unit 152 may be driven by the secondary motor 164.

Illustrated in FIG. 6 is a view looking downward on a aircraft control surface controlled by redundant actuator assemblies. Illustrated in FIG. 7 is a simplified schematic representation of a control circuit which is capable of detecting a mechanical seizure of either actuator assembly and initiating the disconnect of the failed actuator assembly.

Referring to FIGS. 6 and 7, it can be seen that the aircraft control surface 180 is coupled to actuator assemblies 10 and 10' (which are identical to the actuator assembly illustrated in FIGS. 1 and 2). Mounted on the aircraft control surface in proximity to actuator assembly 10 are a set of two strain gages 182, while located in proximity to actuator 10' are a second set of two strain gages 183. The set of two strain gages at each location can be electrically summed to implement the data, or they can be used redundantly to provide a high degree of reliability. While a set of two strain gages are illustrated in each location, it must be understood that a single gage could be located in each location.

The strain gage pairs 182 and 183 are used to detect the presence of torsion and stress in the skin of aircraft control surface 180. The modus operandi is as follows: If there is a mechanical seizure of the left actuator 10, actuator 10' will impart a clockwise or anti-clockwise torque into the control surface 180 (and thus into the skin). The sets of strain gages is then used to discern the faulty actuator assembly.

Referring particularly to FIG. 7, the strain gage sets 182 and 183 inputs are fed into a voltage analog converter 184 which develops a voltage analog of the strain gage set resistance change. The output from the voltage analog converter 184 is fed voltage comparator 185. These voltages are normally balanced when actuators 10 and 10' are operating correctly, since there will be no torsion in the control surface and therefore no difference in resistance of the strain gages. However, if one of the two actuators mechanically seize, the resulting torsion in the control surface will unbalance the strain gage sets and a differential voltage will be detected by the voltage comparator 185. As FIG. 7 illustrates, the output from the voltage comparator 185 is fed to a voltage amplifier/discriminator 186 which then senses polarity and the amplitude of the differential voltage. After detection and discrimination, the output from the voltage amplifier/discriminator 186 is then fed into a switching logic control 188 which includes power switching transistors 190 and 192 and depending on the polarity of the differential voltage transistors 190 and 192 will be turned on to energize either solenoid 40 or 40' withdrawing the pin from the grooved flange of the faulty actuator, leaving the remaining actuator to drive the aircraft control surface 180.

Finally, while the actuator assembly has been described with reference to particular embodiments, it should be understood that such embodiments are merely illustrative as there are numerous variations and modifications which may be made by those skilled in the art. Thus, the invention is to be construed as being limited only by the spirit and scope of the appended claims.

What is claimed is:

1. An actuator system for an aircraft, said aircraft having a control surface rotatably mounted to a portion of said aircraft's structure, said actuator system comprising:
   a rotary actuator rotatably mounted to said aircraft structure, said actuator having an output member coupled to said control surface; and
   latch means mounted on said structure, releasably engaging said actuator, said latch means movable from a first position preventing rotation of said actuator to a second position allowing rotation of said actuator about its axis of rotation.

2. The actuator system as set forth in claim 1 wherein said latch means comprises:
   a grooved protrusion mounted on said actuator; and
   a solenoid operated pin mounted to said structure of said aircraft, said pin movable from a first position engaged with said grooved protrusion to a second position out of engagement with said grooved protrusion.

3. The actuator system as set forth in claim 2 including a second rotary actuator mounted to said structure of said aircraft, said second actuator having an output shaft coupled to said actuator and adapted to rotate said actuator when said latch means is in said second position.

4. The actuator system of claim 2 including said actuator having a drive shaft adapted to rotate said output member and a second rotary actuator mounted to said structure having an output shaft coupled to and adapted to rotate said drive shaft of said actuator.

5. An actuator system for an aircraft, said aircraft having a control surface rotatably mounted to a portion of said aircraft's structure, said actuator system comprising:
   a rotary actuator rotatably mounted to said aircraft structure, said actuator having an output member coupled to said control surface and a drive shaft adapted to drive said output member;

latch means mounted on said structure, releasably engaging said actuator, said latch means moveable from a first position preventing rotation of said actuator to a second position allowing rotation of said actuator about its axis of rotation; and a second rotary actuator mounted to said structure, said second rotary actuator comprising:
an output shaft coupled to an adaptor to rotate said drive shaft of said actuator;
a drive shaft adapted to rotate said output shaft of said second actuator; and
a clutch means mounted within said second actuator adapted to couple and decouple said output shaft from said drive shaft of said second actuator.

6. An actuator system for an aircraft, said aircraft having a control surface rotatably mounted to a portion of said aircraft's structure, said actuator system comprising:
a rotary actuator rotatably mounted to said aircraft structure, said structure having an output member coupled to said control surface;
a second rotary actuator mounted to said aircraft structure, said second actuator having an output member coupled to said control surface;
latch means mounted on said structure, releasably engaging said actuator, said latch means moveable from a first position preventing rotation of said actuator to a second position allowing rotation of said actuator about its axis of rotation; and
sensing means coupled to said latch means adapted to sense failure of said actuator and to cause said latch means to move from said first position to said second position allowing said actuator to rotate about its axis of rotation.

7. The actuator system of claim 6 wherein said sensing means is an electrical circuit comprising:
first and second strain gage assemblies mounted on said control surface in proximity to said first and second actuator assemblies, respectively, said strain gages adapted to sense torsional twist in the control surface caused by an operating actuator acting against a failed actuator;
a voltage analog converter adapted to develop a voltage analog if the strain gage resistance changes;
a voltage comparator coupled to said voltage analog converter adapted to sense the differential output of said first and second strain gages due to an actuator assembly failure;
a voltage amplifier/discriminator coupled to said voltage comparator, said voltage amplifier/discriminator adapted to sense the polarity of the differential voltage; and
a switching logic circuit coupled to said voltage amplifier/discriminator, said switching logic circuit adapted to energize the solenoid of said failed actuator assembly.

8. The actuator as set forth in claim 7 or 5 wherein said latch means comprises:
a grooved protrusion mounted on said actuator; and
a solenoid operated pin mounted to said structure of said aircraft, said pin movable from a first position engaged with said grooved protrusion to a second position out of engagement with said grooved protrusion.

* * * * *